March 26, 1968     H. R. ZEIDLER     3,375,045
ADJUSTABLE V BEARING FOR GUIDING TRANSLATING SHAFTS
Filed April 9, 1965     2 Sheets-Sheet 1

INVENTOR.
H. RUDOLF ZEIDLER,
BY
Berman, Davidson & Berman
ATTORNEYS.

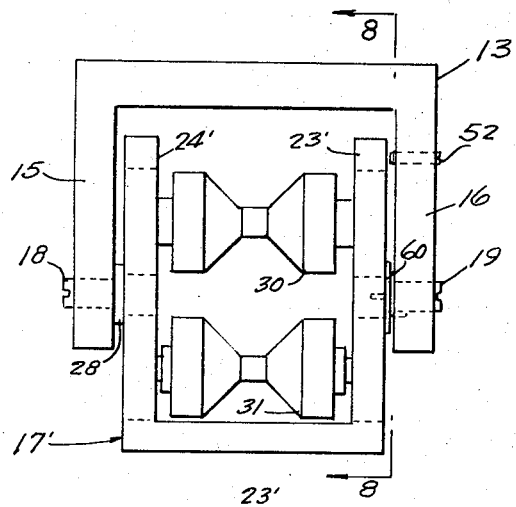
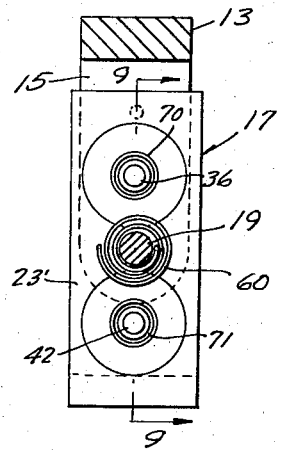
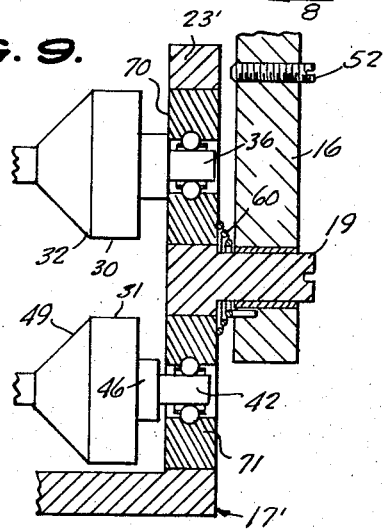
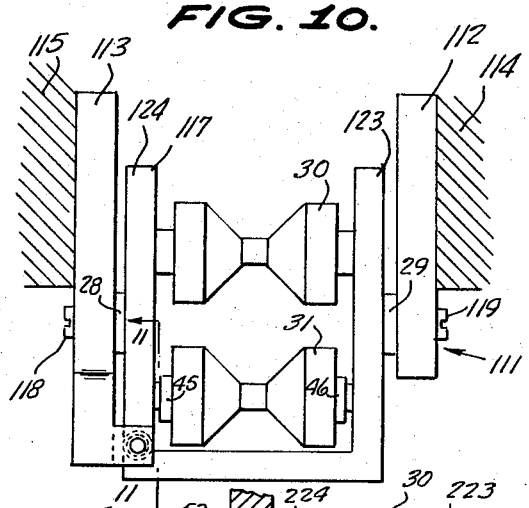
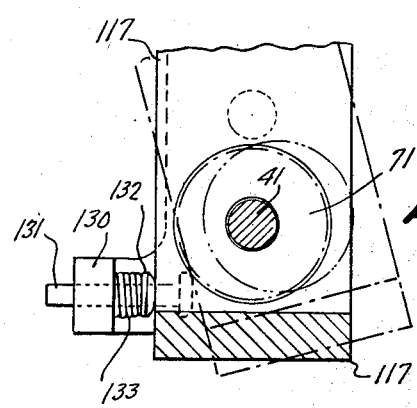
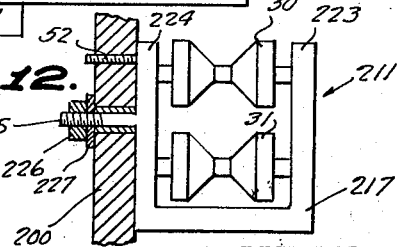

United States Patent Office 3,375,045
Patented Mar. 26, 1968

3,375,045
ADJUSTABLE V BEARING FOR GUIDING
TRANSLATING SHAFTS
Herman Rudolf Zeidler, Plainview, N.Y.
(3812 Dianne St., Bethpage, N.Y. 11714)
Filed Apr. 9, 1965, Ser. No. 446,950
9 Claims. (Cl. 308—6)

This invention relates to shaft-supporting devices, and more particularly to bearing assemblies of the type employed to guide shafts or elongated machine components for linear or translational movement.

A main object of the invention is to provide a novel and improved bearing assembly for supporting and guiding a shaft or other elongated machine member for linear or translational movement, the improved bearing assembly being simple in construction, being readily adjustable over a substantial range so that it may be employed with various sizes and shapes of shafts, being relatively compact in size, and being inexpensive to fabricate.

A further object of the invention is to provide an improved adjustable bearing assembly for supporting and guiding shafts or other elongated machine members for longitudinal translational or reciprocatory motion, the bearing assembly involving only a few parts, being substantially self-aligning, being arranged so that it can accommodate a wide range of diameters or cross-sectional shapes of shafts employed therewith, being comfortable to shafts which are of varying cross-sectional shape along their lengths or which are bowed or otherwise distorted, which is durable in construction, and which is easy to keep clean and lubricated.

A still further object of the invention is to provide an improved bearing assembly for supporting a shaft or other elongated machine member for longitudinal translational or reciprocating movement, the bearing assembly being easy to install, being easy to repair or replace, having a high load-supporting capacity, producing relatively small frictional loss during operation thereof, being easily adjustable to work with shaft diameters varying over a wide range, being likewise readily adjustable to provide any desired class to fit with respect to the associated shaft, and causing minimum wear on said shaft.

A still further object of the invention is to provide an improved bearing assembly for supporting a longitudinally-translating or reciprocating shaft or other machine part, the bearing assembly being easy to lubricate, providing a reliable supporting action for the associated shaft without binding or excessive wearing of the surface of the shaft engaged thereby, and serving to reliably and safely support translating or reciprocating shafts operating even at high speeds and producing a minimum amount of vibration and noise, the bearing assembly being arranged so that the shaft supported thereby moves with minimum vibration and noise.

Further objects and advantages of the invention will become apparent from the following description and claims, and from the accompanying drawings, wherein:

FIGURE 7 is an elevational view, similar to FIGURE 1, but showing a modified form of bearing assembly according to the present invention.

FIGURE 8 is a vertical cross-sectional view taken substantially on the line 8—8 of FIGURE 7.

FIGURE 9 is an enlarged fragmentary vertical cross-sectional view taken substantially on the line 9—9 of FIGURE 8.

FIGURE 10 is an elevational view, similar to FIGURES 1 and 7, but showing a further modified form of bearing assembly according to the present invention.

FIGURE 11 is an enlarged fragmentary vertical cross-sectional view taken substantially on the line 11—11 of FIGURE 10.

FIGURE 12 is a transverse vertical cross-sectional view taken through a vertical wall element and showing another modification of a bearing assembly according to the present invention mounted on said vertical wall element in a position with the plane of the main supporting yoke member of the bearing assembly perpendicular to the vertical wall element.

Figure 1:
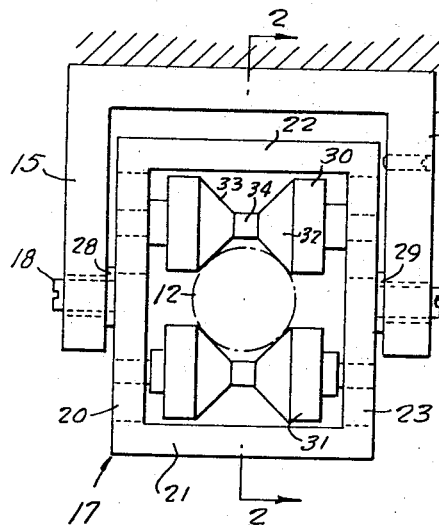
FIGURE 1 is an elevational view of an improved bearing assembly constructed in accordance with the present invention.

Referring to the drawings, and more particularly to FIGURES 1 to 6, 11 generally designates one form of improved bearing assembly for a longitudinally-moving shaft or other machine part, for example, for a longitudinally-reciprocating or translating shaft 12, shown in dotted view. The shaft-supporting assembly 11 comprises an inverted U-shaped main support member 13 which is rigidly secured in any suitable manner to the ceiling 14 or to any other object, where there is to be relative movement between said object and the shaft 12 in the direction of the axis of the shaft. The main supporting element 13 is provided with the respective vertical depending side arms 15 and 16. Generally designated at 17 is a rectangular frame or yoke which is pivotally supported between the side arms 15 and 16 on the axis defined by aligned respective stud elements 18 and 19. The yoke 17 is generally rectangular and has the side arms 20 and 23 and the top and bottom arms 22 and 21. The stud member 18 is integrally-formed at the mid-portion of the side arm 20, and the stud member 19 is integrally-formed at the mid-portion of the side arm 23.

Figure 3:
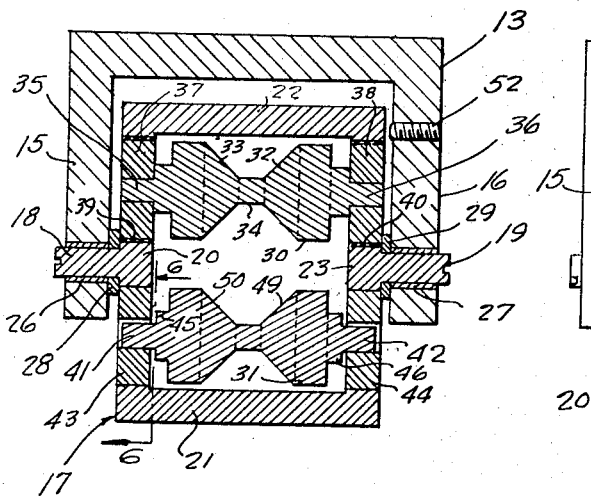
FIGURE 3 is a vertical cross-sectional view taken substantially on the line 3—3 of FIGURE 2.

The stud members 18 and 19 extend through respective bearing bushings 26 and 27 provided in the arms 15 and 16, and respective spacer washers 28 and 29 are provided between yoke arm 20 and arm 15 and between the yoke arm 23 and arm 16, as shown in FIGURE 3. The yoke assembly 17 is thus pivotally supported for adjustment on the horizontal axis defined by the stud elements 18 and 19.

Rotatably supported in the rectangular yoke assembly 17 on spaced parallel axes which are parallel to the horizontal axis defined by stud elements 18 and 19 are respective V-grooved rollers 30 and 31. Each of the rollers 30 and 31 is formed with an annular central V-groove defined by opposing conical walls 32 and 33 which merge with a center portion 34. The conical elements 32 and 33 may be at any suitable angle relative to the roller axis, and are preferably symmetrical relative to the perpendicular bisector of said axis. For example, in the particular embodiment illustrated, the conical surfaces 32 and 33 intersect the plane of the yoke assembly 17 at lines which are substantially at right angles to each other.

The roller 30 is formed with reduced end stud portions 35 and 36 which are rotatably received in rigid bushings 37 and 38 which are, in turn, supported in rubber bushings 39 and 40 or similar bushings of any other suitable resilient deformable material allowing slight yielding of the bushings 37 and 38, and thus allowing corresponding slight yielding movement of the stud elements 35 and 36.

Figure 6:
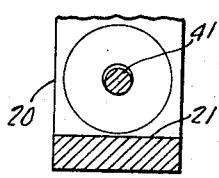
FIGURE 6 is a fragmentary vertical cross-sectional view taken substantially on line 6—6 of FIGURE 3.

The roller 31 is similarly formed with reduced end stud portions 41 and 42 which are loosely received in rigid bushings 43 and 44 secured respectively in side arm 20 and side arm 23, and extending parallel to the resilient deformable bushings 39 and 40 secured in these members. As shown in FIGURES 3 and 6, the stud members 41 and 42 are slightly smaller in diameter than the inside diameter of the bushings 43 and 44 to allow a small amount of play between the stud elements and the bushings in a direction transverse to the roller axis. The annular abutment shoulders 45 and 46 inwardly adjacent the stud elements 41 and 42 likewise terminate short distances inwardly of the inside surfaces of the members 43 and 44 to allow a moderate amount of endwise movement of the roller 31. Thus, the roller 31 is able to shift in accordance with irregularities in diameter of or slight non-linearity of the supported shaft 12 while its conical bearing surfaces 49 and 50 remain in supporting contact with the shaft.

The use of rubber bushings 39 and 40 is optional, and said rubber bushings may be omitted, depending upon required economy of design and required accuracy.

Figure 5:
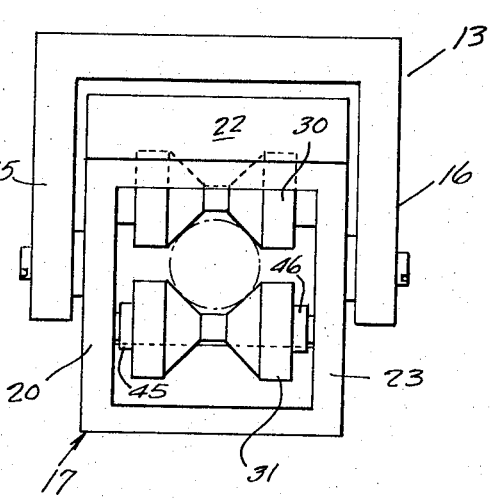
FIGURE 5 is an elevational view taken substantially on line 5—5 of FIGURE 4.

When the assembly 11 is installed, the shaft 12 is passed between the rollers 30 and 31 and the yoke member 17 is angled to a position such that the conical surfaces 32 and 33 of the top roller 30 engage the top surface of the shaft and the conical surfaces 49 and 50 of the bottom roller 31 engage the bottom surface of the shaft. The rectangular yoke assembly 17 may then be locked in this position, for example, by a set screw 52 threadedly engaged through the arm 16, the set screw being tightened so that it lockingly engages the top portion of the side arm 23. Thus, as shown in FIGURE 5, the tightened set screw 52 locks the inclined yoke assembly 17 in working position with the V-rollers 30 and 31 in surface-rolling contact with the shaft 12. When there is relative longitudinal translational or reciprocatory movement between shaft 12 and member 13, the assembly 11 supportingly engages the shaft with the conical surfaces 32, 33 and 49, 50 substantially in continuous surface engagement with the shaft. If the shaft is non-uniform in diameter or is somewhat non-linear, the upper roller 30 is slightly yieldable due to the provision of the resilient bushings 39 and 40, and the lower roller 31 is also self-adjusting to follow the irregularity of the shaft.

Figure 2:
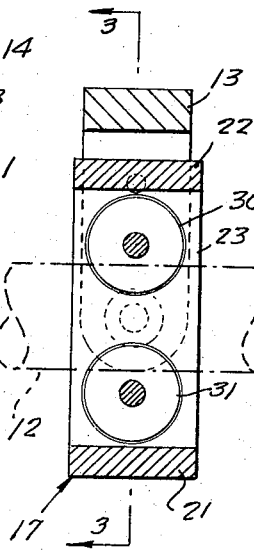
FIGURE 2 is a transverse vertical cross-sectional view taken substantially along the line 2—2 of FIGURE 1.
Figure 4:
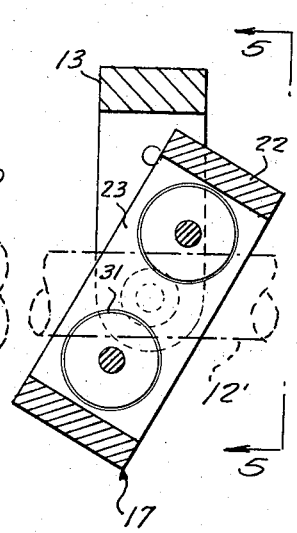
FIGURE 4 is a transverse vertical cross-sectional view, similar to FIGURE 2, but showing the inner yoke member of the assembly inclined at a substantial angle with respect to the outer yoke member to accommodate a shaft of smaller diameter than that shown in FIGURE 2.

It will be noted that in the case of a relatively large diameter shaft, the assembly 17 will be secured in a substantially upright position, namely, substantially perpendicular to the shaft axis, as shown, for example, in FIGURE 2. Where the diameter of the shaft is much smaller, for example, as shown at 12' in FIGURE 4, the yoke assembly 17 can be adjusted to an angularly-inclined position with the conical surfaces 32, 33 and 49, 50 in engagement with the top and bottom surfaces of the shaft. The bearing assembly 11 is thus suitable for use with shafts whose diameters vary over a substantial range. Also, because of the yieldability of the end connections of the top roller and the provision of means for self-adjustment of the bottom roller, the bearing assembly can be employed with shafts whose cross-sectional shape is non-uniform, but essentially radially symmetrical and which is bowed or non-linear along its length.

It will be further noted that the yoke assembly 17 is of open frame-like construction providing easy access to the rollers 30 and 31 so that the rollers may be easily lubricated or cleaned. Also, the assembly can be easily dismantled or disassembled for repair or replacement of any parts, as required.

Referring now to the embodiment illustrated in FIGURES 7, 8 and 9, the assembly may employ a U-shaped inner yoke 17' instead of the closed rectangular frame of the form of the invention illustrated in FIGURES 1 to 6, and if so desired, the top roller 30 may be rotatably supported between the upper portions of the side arms 24' and 23' of the inner yoke in the manner previously described, namely, employing the resilient supporting sleeves 39 and 40. The bottom roller 31 may be likewise mounted in the lower portions of the arms 24' and 23' in the same manner as previously described. The pivot stud 18 is integrally formed with the side arm 24', and a spacer washer 28 may be employed between the arm 24' and the fixed main yoke arm 15. The pivot stud 19 is integraly formed on the opposite yoke arm 23' and is rotatably received in the depending fixed yoke arm 16. As in the previously-described form of the invention, a locking screw 52 may be provided which is lockingly engageable with the yoke arm 23' to lock the adjustable inner yoke 17' in a desired position. Alternatively, a coiled spring 60 may be provided, the spring being spirally coiled and being located between the arm 23' and the arm 16, one end of the spring being anchored to the arm 23', and the other end of the arm being anchored to the arm 16, acting to bias the pivoted inner yoke 17' so that the top roller 30 continuously engages the top surface of the associated shaft and the bottom roller 31 continuously engages the bottom surface of said shaft. The shaft is thus supported by the rollers with a yielding cushioned action.

As shown in FIGURE 9, conventional ball bearing assemblies 70 and 71 may be employed to rotatably support the end studs of the rollers 30 and 31 in the arms 24' and 23'. However, the annular abutment shoulders 45 and 46 terminate a short distance inwardly of the inside surfaces of the arms 24' and 23', as in the previously-described form of the invention, to allow free axial adjustment of the bottom roller 31 in response to deviations in linearity of the associated shaft.

Referring now to the modification illustrated in FIGURES 10 and 11, the form of shaft-supporting assembly therein is illustrated generally at 111, and comprises a pair of vertical supporting bars 112 and 113 which may be secured to respective horizontally-spaced fixed supports 114 and 115, as illustrated, with the arms 112 and 113 depending therefrom in parallel relationship. A U-shaped yoke member 117 is pivoted between the arms 112 and 113, the member 117 having the respective side arms 123 and 124 provided at their intermediate portions with respective aligned outwardly-projecting pivot studs 119 and 118. The pivot studs 119 and 118 may be pivotally mounted in the arms 112 and 113 in the same manner as previously-described with the interposition of respective spacer washers 29 and 28 between the side arms 123, 124 and the adjacent fixed arms 112 and 113. An upper roller 30 is rotatably mounted in the upper portions of the arms 123 and 124 in a suitable manner, for example, by means of ball bearings 70, as illustrated in FIGURE 9. A bottom roller 31 is rotatably mounted in the lower portions of the arms 123, 124, for example, by means of the ball bearing assemblies 71 illustrated in FIGURE 9, and said lower roller 31 is provided with the end abutment shoulders 46 and 45 which are spaced inwardly from the inside surfaces of the arms 123 and 124 to permit end play of the lower roller. The fixed arm 113 is provided at its bottom end with an offset lug 130 in which is slidably mounted a headed pin 131, the lug 130 overlapping the lower portion of arm 124, and the head 132 of the pin being biased into engagement with said lower portion of arm 124 by coiled spring 133 surrounding the pin and bearing between head 132 and lug 130, as shown in FIGURE 11. The spring 133 thus acts to bias the yoke member 117 in a manner to cause the top roller 30 to continuously engage the top surface of a shaft supported in the assembly and the bottom roller 31 to continuously engage the bottom surface of said shaft. This provides a yielding cushioned supporting action generally similar to that obtained by the use of the coiled spring 60 in the embodiments of the invention illustrated in FIGURES 7, 8 and 9.

FIGURE 12 illustrates a further embodiment of a shaft-supporting assembly according to the present invention, which may be pivoted to a vertical supporting wall or plate 200 and which may be locked in adjusted angular position thereon. Thus, the assembly is designated generally at 211 and comprises a U-shaped yoke member 217 having the side arms 224 and 223. The top roller 30 is rotatably mounted between the upper portions of the side arms 224 and 223, and the bottom roller 31 is rotatably mounted between the lower portions of said side arms. The respective rollers 30 and 31 may be rotatably mounted in the side arms in any of the ways previously described, for example, in the manner illustrated in FIGURE 3 to allow reasonable deviation of the top roller 30 and desired play of the bottom roller 31 responsive to irregularities or non-linearities of the associated shaft. The side arm 224 is provided with the horizontally-projecting integral supporting stud 225 which is rotatatably supported in the vertical plate or wall 200 and which is secured thereto by means of a nut 226 with a washer 227 provided between the nut and the vertical supporting element 200. A set screw 52 may be provided in the vertical supporting wall or plate element 200, the set screw being lockingly engageable with the upper portion of the side arm 22 to lock the yoke 217 in its desired angularly-adjusted position wherein the conical surfaces of the top roller 30 are in substantially continuous engagement with the top surface of the supported shaft and the conical surfaces of the bottom roller 31 are in substantially continuous engagement with the bottom surfaces of said shaft.

As above-mentioned, the various forms of the shaft-supporting bearing devices above-described are of relatively open construction, affording easy access to the rollers and associated parts for cleaning or lubrication, and affording relatively little opportunity for the accumulation of foreign material thereon, such as dust, dirt, and grit. It will also be noted that the bearing devices above-described are substantially self-adjusting and will provide close supporting contact with the associated shaft regardless of variations in cross-sectional diameter of the shaft or of non-linearity thereof. Thus, the above-described bearing devices present considerable advantages over the bearing devices previously employed for the same purpose, for example, over the ball bearing type bushing devices wherein bearing balls are free to roll in a track positioned between the shaft and the bushing, the track being parallel to the axis of the shaft. In the relatively expensive and complicated linear bushing devices of this type, there are various undesirable limitations and disadvantages. For example, the load-carrying capacity of the bushing is limited by the load-carrying capacity of the balls, there are critical tolerances as to the fit between the shaft and other parts of the bushing, and damage to the balls frequently occurs due to binding and misalignment. Furthermore, it is very difficult to maintain such bushings clean and free of foreign material. The entry of foreign material causes gumming, oxidation, and eventual breakdown of the lubricant employed with the bushing.

Similar disadvantages are present with linear bushings of the solid metal type. As in the case of the ball bearing type bushings, there are severe limitations with respect to tolerances and provision for variations in cross-sectional diameter and linearity of the associated shaft.

Therefore, it will be readily apparent that the shaft-supporting bushings of the present invention present clear-cut and definite advantages over the previously-employed bushings with respect to the features above-mentioned, and mainly with respect to the fact that the bushings of the present invention are self-aligning, so that successive pairs of bushings will be properly aligned relative to each other, and that the bushings are quite suitable for bowed, eccentric, or heavily-loaded shafts. The open construction of the bushings makes them easy to lubricate and provides ample ventilation so that they will not overheat. Also, because of the relatively limited points of frictional contact and because of the yieldability of the supporting elements of the bushing of the present invention, there is a minimum amount of wasted horsepower derived from frictional loss.

While certain specific embodiments of an improved bearing assembly for supporting a linearly-moving shaft have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a shaft and bearing assembly, a support, a yoke member pivoted to said support, a shaft extending through said yoke member, respective rollers journaled in said yoke member above and below the shaft and on substantially parallel axes spaced on opposite sides of and parallel to the pivotal axis of the yoke member, said rollers having annular peripherally-recessed bearing portions engageable with the shaft with rolling contact, and means between the support and the yoke member holding the yoke member in a selected rotated position between extreme pivotal limits relative to the support, maintaining said rolling contact.

2. In a shaft and bearing assembly, a support, a yoke member pivoted to said support, a shaft extending through said yoke member, respective rollers journaled in said yoke member above and below the shaft on substantially parallel axes spaced on opposite sides of and parallel to the pivotal axis of the yoke member, said rollers having annular peripherally-recessed surface bearing portions engageable with the shaft with rolling contact, and clamping means on the support engaged with the yoke member and holding the yoke member in a selected rotated position between extreme pivotal limits relative to the support, maintaining said rolling contact.

3. In a shaft and bearing assembly, a support, a yoke member pivoted to said support, a shaft extending through said yoke member, respective rollers journaled in said yoke member above and below the shaft on substantially parallel axes spaced on opposite sides of and parallel to the pivotal axis of the yoke member, said rollers having annular peripherally-recessed surface bearing portions engageable with the shaft with rolling contact, and spring means between the support and the yoke member, holding the yoke member in a selected rotated position between extreme pivotal limits relative to the support and maintaining such rolling contact.

4. In a bearing assembly, a stationary support, a flat frame-like yoke member rotatably-mounted in said support on a substantially horizontal axis in the plane of the yoke member, parallel horizontal rollers spaced on opposite sides of said horizontal axis and journaled in said yoke member above and below said axis, each of said rollers having a V-shaped central portion adapted to make rolling contact with an elongated shaft extending through the yoke member between the rollers, and locking means on the support clampingly-engaging the yoke member and releasably-locking the yoke member in a position of selected angular adjustment between extreme pivotal limits relative to the support.

5. In a bearing assembly, a stationary support, a flat frame-like yoke member rotatably-mounted in said support on a substantially horizontal axis in the plane of the yoke member, parallel horizontal rollers spaced on opposite sides of said horizontal axis and journaled in said yoke member above and below said axis, each of said rollers having a V-shaped central portion adapted to make rolling contact with an elongated shaft extending between the rollers, and spring means between the support and the yoke member urging the yoke member rotationally relative to the support in a direction to maintain contact between the rollers and the shaft.

6. In a bearing assembly, a stationary support, a flat frame-like yoke member rotatably-mounted in said support on an axis in the plane of the yoke member, a first roller, means yieldably and rotatably-supporting the ends of the first roller in opposite side portions of the yoke member, a second roller parallel to and spaced from the first roller, means loosely and slidably-supporting the ends of the second roller in said opposite side portions, the rollers being spaced on opposite sides of and being on axes parallel to said first-named axis, each of said rollers having a portion adapted to make rolling contact with an elongated shaft extending between the rollers, and locking means on the support clampingly-engaged with the yoke member and releasably-locking the yoke member in a position of selected angular adjustment between extreme pivotal limits relative to the support.

7. In a bearing assembly, a stationary support, a flat frame-like yoke member rotatably-mounted in said support on an axis in the plane of the yoke member, a first roller, means yieldably and rotatably-supporting the ends of the first roller in opposite side portions of the yoke member, a second roller parallel to and spaced from the first roller, means loosely and slidably-supporting the ends of the second roller in said opposite side portions, the rollers being spaced on opposite sides of and being on axes parallel to said first-named axis, and spring means between the support and the yoke member and urging the yoke member rotationally relative to said support in a direction to maintain contact between the rollers and a shaft element disposed between said rollers.

8. In a bearing assembly, a stationary support, a flat frame-like yoke member rotatably-mounted in said support on an axis in the plane of the yoke member, a first roller, means yieldably and rotatably-supporting the ends of the first roller in opposite side portions of the yoke member, a second roller parallel to and spaced from the first roller, means loosely and slidably-supporting the ends of the second roller in said opposite side portions, the rollers being spaced on opposite sides of and being on axes parallel to said first-named axis, each of said rollers having a portion adapted to make rolling contact with an elongated shaft extending between the rollers, and a locking screw on the support engaged with one of said side portions and releasably-locking the yoke member in a position of angular adjustment relative to the support.

9. In a bearing assembly, a stationary support, a flat frame-like yoke member rotatably-mounted in said support on an axis in the plane of the yoke member, a first roller, means rotatably-supporting the ends of the first roller in opposite side portions of the yoke member, a second roller parallel to and spaced from the first roller, means rotatably and slidably supporting the ends of the second roller in said opposite side portions, the rollers being spaced on opposite sides of and being on axes parallel to said first-named axis, each of said rollers having a portion adapted to make rolling contact with an elongated shaft extending through the yoke member between the rollers, and a coiled spring connected to the support and one of said side portions and acting to rotate the yoke member relative to the support.

References Cited

UNITED STATES PATENTS

| 572,384 | 1/1896 | Smity | 308—7 |
| 813,588 | 2/1906 | Rollins | 308—7 |
| 2,422,353 | 6/1947 | Hitt | 254—190 X |
| 2,458,573 | 1/1949 | Donahue | 254—190 |
| 2,627,323 | 2/1953 | Larson. | |
| 2,845,038 | 7/1958 | Crawford | 308—6 |
| 3,097,892 | 7/1963 | Newbury | 308—6 |

FOREIGN PATENTS

| 706,218 | 4/1941 | Germany. |
| 287,664 | 3/1928 | Great Britain. |
| 593,303 | 10/1947 | Great Britain. |
| 600,960 | 9/1945 | Great Britain. |
| 368,726 | 3/1939 | Italy. |

MARTIN P. SCHWADRON, *Primary Examiner.*

L. L. JOHNSON, *Assistant Examiner.*